United States Patent [19]

Takatoki et al.

[11] 3,997,318
[45] Dec. 14, 1976

[54] PLUNGER FOR FORMING HOLLOW GLASS ARTICLES

[75] Inventors: Yoshio Takatoki, Takasago; Mitsuo Nakata, Funabashi, both of Japan

[73] Assignee: Asahi Glass Co., Ltd., Tokyo, Japan

[22] Filed: Oct. 16, 1975

[21] Appl. No.: 623,017

[30] Foreign Application Priority Data

Oct. 16, 1974  Japan .......................... 49-118023

[52] U.S. Cl. ................. 65/362; 65/319; 65/356
[51] Int. Cl.² ..................................... C03B 11/10
[58] Field of Search .................... 65/319, 356, 362

[56] References Cited
UNITED STATES PATENTS 3,285,728  11/1966  Torok .............................. 65/362 X

FOREIGN PATENTS OR APPLICATIONS 179,818  8/1904  Germany .............................. 65/356

*Primary Examiner*—Arthur D. Kellogg
*Attorney, Agent, or Firm*—Oblon, Fisher, Spivak, McClelland & Maier

[57] ABSTRACT

A plunger for forming hollow glass articles and having a nose piece projecting outwardly of its pressing surface, incorporates a main cooling system for cooling the main pressing surface extending around the nose piece, and a sub-cooling system located interiorly of the nose piece and independently of the main cooling system for cooling the nose piece, thereby making it possible to control the temperature of the nose piece by means of the sub-cooling system which employs a refrigerant having a different cooling efficiency from the refrigerant of the main cooling system.

5 Claims, 3 Drawing Figures

PLUNGER FOR FORMING HOLLOW GLASS ARTICLES

BACKGROUND OF THE INVENTION

1. Field of the Invention

The present invention relates generally to a plunger used for forming hollow glass articles, and more particularly to a plunger which incorporates a dual cooling system therein for separately cooling different portions thereof.

1. Description of the Prior Art

Plungers used for forming hollow glass articles, such as, for example, funnels for TV glass bulbs or tubes, have a nose piece projecting outwardly of its main pressing surface which is used for forming the funnel-shaped projecting bottom part of the TV tube. Such plungers are subjected to the extremely high temperatures of the molten glass disposed within the bottom mold at the time of the press forming operation, and therefore, conventionally has cooling equipment, for cooling the same, incorporated therein.

Conventionally, such plunger cooling was performed by means of a water cooling system, however, this resulted in the refrigerant performing a uniform cooling of the entire plunger apparatus without regard to the thickness of the glass, or the shape of glass articles, in contact therewith. Consequently, due to the difference in the heat generated by means of the high temperature molten glass portions of different thickness or shape, the nose piece of the plunger, for example, wherein the wall thickness is small, became effectively excessively cooled resulting in the breakage of the glass products in contact therewith, or other defects, such as, for example, cracking of the same, or the like.

Accordingly, in order to prevent such excessive cooling, the thickness of the nose piece per se was made different, in accordance with conventional practice, however, regarding such products as the previously mentioned TV funnels, which have extreme differences in glass thickness, it is nevertheless difficult to perform adequate cooling over all parts thereof wherein the glass thickness is sometimes large and with respect to other areas wherein it is excessively thin, when using a refrigerant having an identical cooling efficiency throughout its operation. Consequently, adequate temperature control of the plunger has not been possible to obtain.

SUMMARY OF THE INVENTION

Accordingly, it is an object of the present invention to adequately control the temperature of the plunger by using refrigerants having different cooling efficiencies depending upon whether the portion of the device to be cooled is one wherein the product wall thickness is large and high cooling efficiency is required, or alternatively, is one wherein the wall thickness is thin and a small amount of cooling is sufficient.

The foregoing and other objectives are achieved in accordance with the present invention through the provision of a plunger used for forming hollow glass articles and provided with a nose piece projecting outwardly of its pressing surface, wherein a main cooling system is used for cooling the main forming surface extending around the nose piece, and a sub-cooling system located interiorly of the nose piece is utilized for cooling the nose piece, the temperature of the nose piece being controlled by using a refrigerant having a different cooling efficiency within the sub-cooling system than that of the refrigerant used within the main cooling system.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 1:
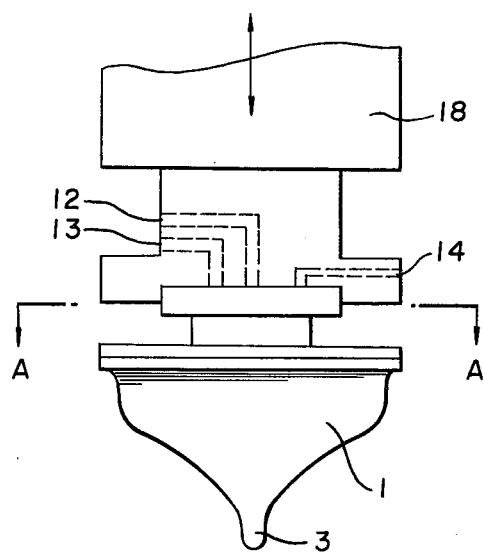
FIG. 1 is a side elevation view of the plunger apparatus constructed in accordance with the present invention and showing its cooperative parts.
Figure 2:
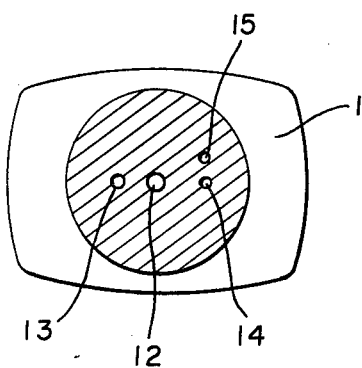
FIG. 2 is a cross-sectional view of the apparatus of FIG. 1 taken along the line A—A of FIG. 1.

Referring now to the drawings, it is apparent therefrom that a plunger 1 has a forming surface which includes a generally rectangular base portion and a funnel-shaped forward portion, the central portion of the forward portion being provided with an axially extending nose piece projecting forwardly thereof. The plunger 1 is also installed upon the front end of a reciprocable piston rod 18 of a cylinder mechanism, not shown, and consequently, the molten glass which is fed into a bottom mold 2, as seen within FIG. 3, is pressed by means of the plunger 1.

During the press forming operation, the nose piece 3 forms the neck seal portion of the TV funnel and the main forming surface extending rearwardly of and around the nose piece 3 forms the remaining parts of the funnel which likewise extend rearwardly of and about the neck seal portion of the TV funnel. It is thus seen to be quite important that the shape of the nose piece 3 is such as to project forwardly of the main forming surface and such shape can be suitably selected depending upon the shape of the TV funnel desired.

Figure 3:
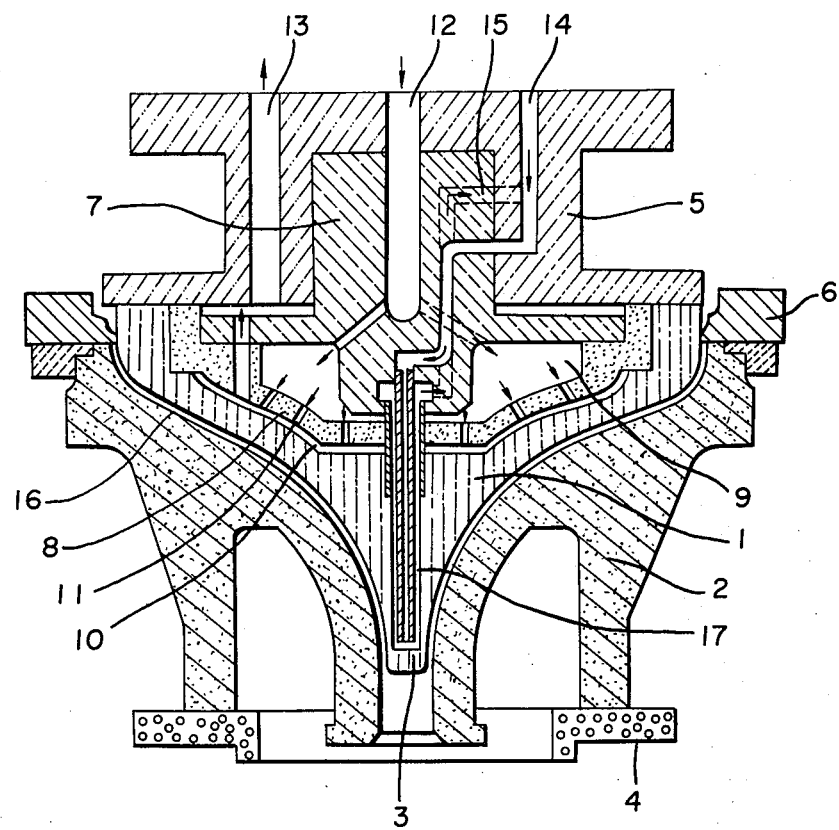
FIG. 3 is a longitudinal cross-sectional view of the apparatus of FIG. 1 showing the particular structure of the cooling system characteristic of the present invention.

Referring now specifically to FIG. 3, there is shown an example of a cooling system employed interiorly of the plunger 1 for cooling the same during the press forming operation, and it is seen that the cooling system comprises a main cooling system utilized for cooling the main forming surface of the plunger, and a secondary cooling system which substantially cools the nose piece 3, the main or primary cooling system being disposed throughout the interior portion of the plunger defining and supporting the main forming surface so as to cool the main forming surface from the inside of the plunger, and the sub-cooling system is disposed interiorly of the nose piece 3 and independently of the main cooling system.

More particularly, the main cooling system comprises an inner member 8 having a contour substantially corresponding to that of the main forming surface of the plunger and disposed axially rearwardly of the main surface portion so as to define therewith a substantially radially extending chamber or space 10 within which cooling water can flow, the cooling water being supplied thereto by means of an inlet 12, an annular cavity 9 defined within and disposed rearwardly of the inner member 8, and a plurality of small holes or apertures 11 defined within inner member 8. In this manner, the coolant serves to cool the interior portion of the main pressing surface of the plunger 5 during the pressing operation.

The cooling water is exhausted or drained through means of an outlet 13, and in this manner, the plunger's main pressing surface is cooled, and the temperature thereof controlled to the desired temperature, by means of a flow of an adequate quantity of cooling water which is continuously circulated through the aforenoted flow channels and throughout the system.

The secondary cooling system is, as noted heretofore, provided independently of the main cooling system, and is seen to comprise a pipe or conduit 17 disposed within a cavity which is partitioned from the main cooling system and which is disposed interiorly of the nose piece of the plunger. The refrigerant utilized within such sub-cooling system has a different cooling efficiency than that of the refrigerant utilized within the main cooling system, and more particularly, the cooling efficiency of the refrigerant utilized within the sub-cooling system is lower than that of the main cooling system refrigerant, and consequently, the nose piece 3 of the plunger 1 is cooled less efficiently than that of the main pressing surface. Usually, air, which has a cooling efficiency lower than that of water, is utilized as the refrigerant for the sub-cooling system, thus preventing excessive cooling of the nose piece 3. In accordance with the foregoing, the cooling air is conducted axially into pipe 17 through means of an inlet passageway 14, and ultimately, the same is exhausted through means of the space defined between the nose piece and the lower end of pipe 17 and an annular space defined about pipe 17 within the nose piece so as to be exhausted through means of an outlet pipe 15, thereby cooling the nose piece 3 during flow therethrough.

The distinctive point then of the present invention is that the cooling apparatus thereof consists of a main and a sub-cooling system, and that the refrigerant for each system has different cooling efficiencies. Usually, a refrigerant having a lower cooling efficiency than that of the refrigerant of the main system is utilized for cooling the nose piece 3 of the plunger in order to prevent excessive cooling of the same, and according to numerous experiments, it is considered desirable to employ water, which has been widely used as a refrigerant, for the main cooling system and to use air for the sub-cooling system. It is of course apparent, however, that in accordance with the present invention, other refrigerants can be used, or refrigerants of the same kind can be used for both cooling systems, that is, two different fluid gases, or two different fluid liquids, or the like. In addition, the same refrigerant may in fact be used within both systems, and in such cases, the objects of the present invention can nevertheless be attained by adjusting the cooling efficiency affecting the plunger by using a different refrigerant temperature and/or flow rate depending upon whether the refrigerant is used for the main cooling system or the sub-cooling system.

Furthermore, in accordance with the present invention, the structure of the main cooling system is not limited to the embodiment shown within FIG. 3 and can be suitably altered as long as the desired objects can be attained. What is of paramount importance in any case, is that the selected refrigerants for each of the main and sub-cooling systems cool the plunger from the interior portion thereof so as to obtain a suitable temperature distribution over the entire main pressing surface and nose piece in order to facilitate a smooth pressing operation.

As the present invention permits the separate control of the cooling efficiency of the refrigerants utilized within both cooling systems by means of structure wherein the nose piece is cooled by means of a sub-cooling system independent of the main cooling system, it is possible to effectively control the cooling of the nose piece 3, which is apt to be excessively cooled, to an adequate temperature, and to efficiently press-form TV funnels using molten glass which is conducted into the bottom mold 2 within the forming cavity surrounded by the shell-mold 6.

Still further, as the temperature of the nose piece 3 can be precisely controlled by means of the sub-cooling system, it is possible to avoid breakage of, or the formation of cracks within, parts of the TV funnels formed by the noise piece at which position the glass thickness is comparatively thin. It can of course be yet further appreciated that the present invention is also usable, not only for the formation of TV funnels, but is likewise effective for other kinds of hollow glass article manufacture.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A plunger for forming a hollow glass article which has a nose piece projecting substantially axially from a main pressing surface of the plunger, comprising:

a circulatory main cooling system which is disposed interiorly of said plunger for cooling said main pressing surface extending substantially annularly around said axially extending, projecting nose piece; and a circulatory sub-cooling system which is disposed substantially solely interiorly of said axially extending, projecting nose piece for cooling said nose piece, said sub-cooling system being separate and independent of said main cooling system and including a coolant different from that of said main system, the temperature of said nose piece thereby being controlled by said sub-cooling system which has a cooling efficiency different from that of said main cooling system.

2. The plunger according to claim 1 wherein:

the cooling efficiency of said sub-cooling system is lower than that of said main cooling system.

3. The plunger according to claim 1 wherein:

said main cooling system is cooled with a coolant of water while said sub-cooling system is cooled with a coolant of air.

4. The plunger according to claim 1 wherein:

said main cooling system includes a coolant inlet passage, a coolant passage for conducting said coolant through said plunger, and a coolant outlet passage; and said sub-cooling system includes a coolant inlet passage, a coolant passage for conducting said coolant through said nosepiece, and a coolant outlet passage, said passages of said main cooling system being independent of said passages of said sub-cooling system.

5. The plunger according to claim 1 wherein:
said coolant passage of said main cooling system is disposed substantially parallel of said main pressing surface; and
said coolant passage of said sub-cooling system is a dual-tubular structure within said nose piece.

* * * * *